Oct. 1, 1963 E. S. WEIBEL 3,105,803
GAS CONFINING APPARATUS
Filed Jan. 15, 1958 2 Sheets-Sheet 1
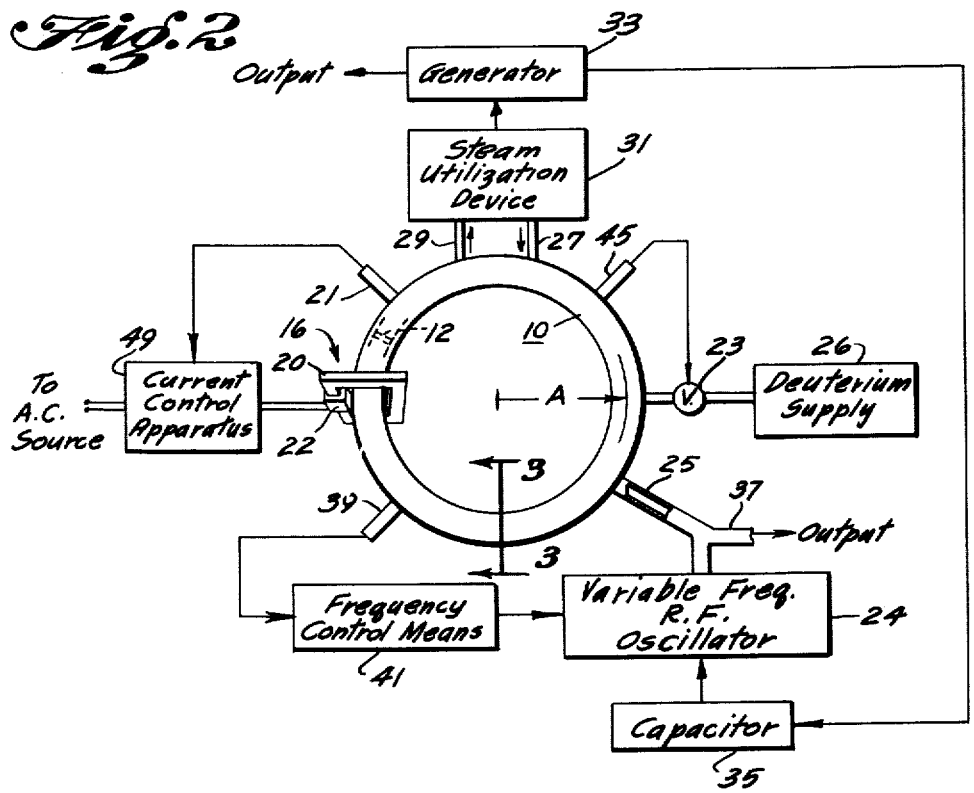
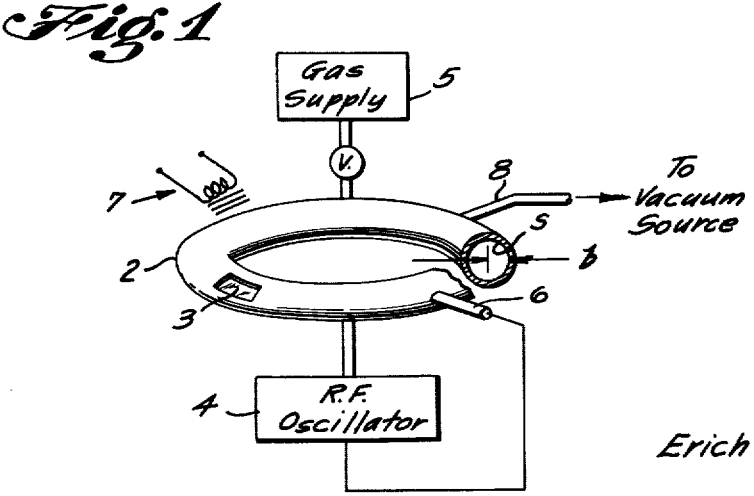
Erich S. Weibel
INVENTOR.
BY Albert Rosen
Morris Spector,
ATTORNEYS Oct. 1, 1963    E. S. WEIBEL    3,105,803
GAS CONFINING APPARATUS
Filed Jan. 15, 1958    2 Sheets-Sheet 2

Radiation Confinement

TE₀₁ Mode
Radius →

TM₀₁ Mode
Radius →

Radiation and Magnetic Confinement

Erich S. Weibel
INVENTOR.

BY Albert Rosen
Morris Spector
ATTORNEYS

United States Patent Office 3,105,803
Patented Oct. 1, 1963

3,105,803
GAS CONFINING APPARATUS
Erich S. Weibel, Redondo Beach, Calif., assignor, by mesne assignments, to Space Technology Laboratories, Inc., El Segundo, Calif., a corporation of Delaware
Filed Jan. 15, 1958, Ser. No. 709,122
3 Claims. (Cl. 204—193.2)

This invention relates to a method and apparatus for confining gas within a predetermined volume and, while not limited thereto, is herein described as embodied in a gas confining method and apparatus utilizing electromagnetic radiation.

In accordance with the invention the gas to be confined is first ionized to render at least a portion of the gas electrically conductive. The at least partially conductive gas is subjected to an electromagnetic field of a character such that the gas is compressed and heated. In one embodiment of the invention, gas within a resonant cavity is subjected to radio frequency electromagnetic radiation, the radiation first ionizing the gas and then supplying an electromagnetic radiation pressure between the ionized gas and the walls defining the cavity. The radiation pressure compresses the gas to a relatively small region within the cavity. Consequently, high temperature gaseous phenomena may be studied without the problems attendant on mechanical confinement of a compresesd, heated gas. Thus, for example, the radiation pressure may be used to confine the gas to a region within the cavity spaced apart from the cavity walls. In such a case the melting point of the material of the walls is not a direct factor on the upper limitation of the temperature of the gas to be confined.

According to another embodiment the radiation gas confinement arrangement described is supplemented with a magnetic gas confinement arrangement. In this embodiment the radiation gas confinement arrangement is used to supplement and contain within a predetermined volume the unstable magnetic confinement arrangement so as to take advantage of the relatively low input power requirements of the magnetic confinement arrangement.

According to a still further embodiment a radiation gas confinement arrangement according to the invention is used to provide a source of high velocity ions.

In the drawing, wherein like reference characters refer to like parts:

FIGURE 1 is a schematic representation of a gas confinement arrangement embodying the principle of the invention;

FIGURE 2 is a schematic illustration representative of gas confinement apparatus embodying the principle illustrated in FIGURE 1 as used in practicing one form of the invention;

The method and apparatus of the invention is based upon the known principle that reflected electromagnetic radiation exerts on the reflector a pressure commonly known as "light" or radiation pressure. While the magnitude of radiation pressure ordinarily experienced (for example, that experienced as radiation from the sun) is relatively low, the arrangement according to the invention provides a means for utilizing radiation pressure in a form wherein appreciable force is exerted by this pressure. This utilization of radiation pressure is realized in one form of the invention by providing a resonant cavity in which radiation is allowed to be reflected between the walls defining the cavity and the gas to be confined. The magnitude of the radiation pressure is made large enough (by an appropriate radio frequency energy input) so that, when the gas is subjected to the radiation, it is first ionized and then confined to a relatively small volume within the cavity by the interaction of the ionized gas with the electric and magnetic fields of the confining radiation.

The principle of the invention will be described in connection with FIGURE 1 where there is shown schematically a high temperature gas observation apparatus 1. A toroidal container or toroid 2, made of conductive material and defining a resonant cavity therein, is used as a physical container within which the gas to be studied is compressed and heated. A window 3 is disposed in the walls of the toroid 2 so that gas within the toroidal cavity may be observed. The window 3 has a conductive inner surface so as to avoid a gap in the cavity walls at the window.

Figure 3:
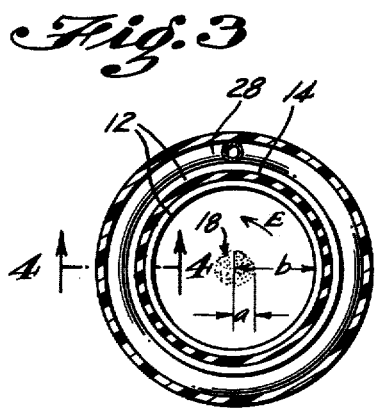
FIGURE 3 is a sectional view taken along lines 3—3 of FIGURE 2.

For convenience of explanation the following dimensional notations will be used: the minor radius of the toroid will be referred to as "$b$," the major radius of the toroid as "$A$," the minor circumference as "$s$," and the radius of the toroid gas body within the toroid 2 as "$a$" (FIGURE 3). The actual dimensions may be, as will be described below in connection with an example of a gas body having a temperature of the order of $3 \times 10^8$ degrees Kelvin and an electron density of $10^{19}$ electrons per cubic meter, $a=.168$ centimeter, $b=4.64$ meters, and $A=46.4$ meters.

As shown in FIGURE 1, a radio frequency oscillator 4 is connected to the toroid 2 to supply radio frequency energy to the cavity therewithin, a vacuum connection 8 is used to evacuate the toroid 2 to a vacuum of the order of about $10^{-6}$ millimeters of mercury, and a gas supply source 5 is connected to the toroid 2 for supplying the toroidal cavity with the gas to be studied. This oscillator 4 may be any of the known radio frequency oscillators and may, for example, be any of the usual magnetron oscillators known in the art such as the one illustrated on page 163, "Radar System Fundamentals," Navships 900,017, published by the Navy Department, Washington, D.C. The wave length of the radio frequency energy supplied by the oscillator 4 to the toroid 2 is of the order of twice the length of the minor radius $b$ of the toroid when the toroid is excited in the $TE_{01}$ mode (the wave length being of the order of 6 centimeters for a toroid having a minor radius $b$ of 3 centimeters), and the wave length is of the order of four times the length of the minor radius $b$ when the toroid is excited in the $TM_{01}$ mode. The TE and TM modes of operation will be referred to in greater detail below.

At any given high temperature the kinetic energy of the gas gives rise to an output of a known spectrum of light or other extremely short wave length electromagnetic radiation. A photocell, spectroscope, or similar detector 6 is connected for observation of the gas within the toroid 2. The detector 6, in turn, is coupled to the oscillator 4 to control, as desired, the frequency and/or amplitude of the energy supplied by the oscillator to the toroid. Since oscillator frequency and amplitude control arrangements are well known in the art they will not be further discussed here. The magnitude of the electromagnetic energy supplied to the toroid is dependent upon the degree of gas compression and heating desired. The electromagnetic energy supplied by the oscillator 4 to the toroid 2 may be supplied either continuously or in pulses. In the latter case the pulsed operation of the oscillator may be realized by storing energy in a capacitor (as will be described in greater detail in connection with FIGURE 2) and periodically discharging the capacitor.

The mechanism of the operation of the gas control method and apparatus of the invention will now be discussed. In order to maintain the gas to be studied confined to the central region of the toroidal cavity, the space within the cavity is excited in either the transverse electric mode $TE_{01}$ or in the transverse magnetic mode $TM_{01}$ when the toroid 2 has a substantially circular small cross section. These modes give rise to the electric (E) and magnetic (B) field configurations illustrated in FIGURES 6 and 7 in which toroidal cavity radius is plotted against field strength. While, as will be described, both the transverse electric (TE) and the transverse magnetic (TM) modes may be used in providing the radiation pressure described, the TM mode is preferred. The reason for this is that the TM mode requires a smaller amount of confinement power than the TE mode to realize a given degree of gas confinement. The lower power requirement arises from the fact that in the TM mode the magnitude of the magnetic field in the region of the surface of the gas body under confinement is inversely proportional to the radius $a$ of the gas body. The relationship is actually $$B_{(a)} = \frac{\text{constant}}{a \log a}$$

The particular electric (TE) or magnetic (TM) mode used is chosen such that the electric field (E) of the radio frequency energy has a voltage null or node confined to a central region of the cavity, that is, a node that does not extend to the cavity walls. Consequently, among the transverse electric modes, the use of electric mode $TE_{01}$ (FIGURE 6) is preferred in a toroidal cavity of the type shown in FIGURE 1 since this electric mode appears to be the only one in which the electric field (E) of the radio frequency energy has voltage nodes or nulls in only one effective region within the cavity, that is, along the region of the cavity adjacent to the center of the cavity. Actually, the electric field (E) in the $TE_{01}$ mode also has voltage nulls along the walls of the toroid but, as will be explained, these latter nulls are unimportant. As will be shown in connection with Equations 22 and 23 below, a charged particle (such, for example, as an electron or charged ion) is attracted to a node of an electric field. Therefore, ionized gases will be attracted to the center of the cavity and to the walls defining the cavity. Those gases that move to the central region of the cavity will be maintained there, while those gases that reach the walls will be neutralized on contact with the walls and will eventually drift toward the central region of the cavity where, on becoming ionized, they will be trapped by the central voltage node. The magnetic field (B) in the $TE_{01}$ mode has substantially equal field intensities in the central and wall regions of the cavity and contributes to the attraction of ionized gases to the central and wall regions in a manner similar to that described with respect to the electric field (E).

Among the transverse magnetic modes the use of magnetic mode $TM_{01}$ (FIGURE 7) is preferred in a toroidal cavity of the type shown in FIGURE 1 since this magnetic mode is apparently the only one in which the magnetic field strength in the central region of the cavity can be made substantially greater than the field strengths of the magnetic and electric fields in any other region of the cavity. In the $TM_{01}$ mode, with a given gas density or gas body radius $a$ and magnitude of electromagnetic gas confinement radiation, the ratio of the magnetic field strength at the cavity walls to the magnetic field strength at the surface of gas filament is, as indicated above, substantially inversely proportional to the ratio of the small radius $b$ of the toroid to the small radius $a$ of the gas filament.

Figure 9:
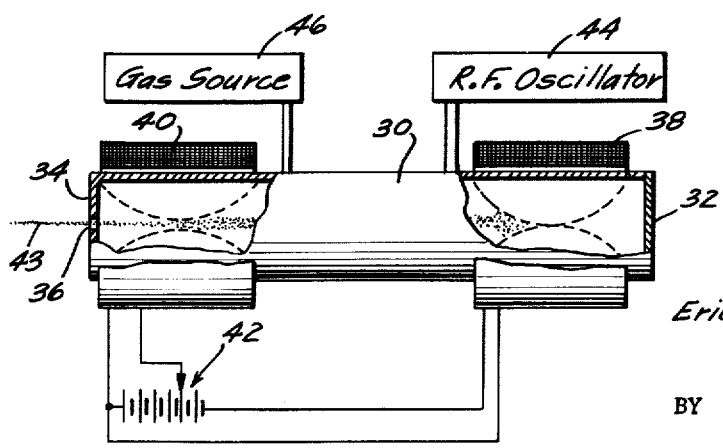
FIGURE 9 is a partially schematic representation of an ion source arrangement according to the invention.

While the toroid 2 illustrated by way of example has a circular small cross section it will be appreciated that the cross section may take different forms. For example, the small cross section may instead be elliptical or rectangular in form; in such a case TE and TM modes other than those mentioned above may instead be used provided no nodal surfaces extend to the cavity walls. For convenience of construction the force fields providing gas containment action have been described with reference to a toroidal resonant cavity. It will be appreciated, however, that other cavity contours may instead be used. For example, an elongated container may be used provided that means are used to prevent gas losses at the ends of the container. The ends of the container may be sealed by means of magnetic fields positioned at the ends of the cavity so as to, in effect, "pinch off" the ends of the cavity with magnetic fields. One such pinching arrangement will be described in connection with FIGURE 9.

Since a gas confinement arrangement of the type described requires an appreciable amount of power input, an auxiliary magnetic field may be used in combination with the radiation pressure arrangement described to provide a resultant confinement force which requires appreciably lower confinement input energy. The auxiliary magnetic field may, for example, be of the well known "pinch effect" type described, for example, in the article entitled "Controlled Fusion Research—An Application of the Physics of High Temperature Plasmas," by Richard F. Post, on pages 345 and 346, in "Reviews of Modern Physics," volume 28, number 3, July 1956, published by the American Institute of Physics, New York, N.Y.

The auxiliary magnetic field referred to may be realized by inducing an electric current in the gas within the toroid 2 once the gas has been rendered conductive by virtue of being ionized by the electromagnetic radiation supplied by the oscillator 4. A primary coil 7 is disposed closely adjacent to the toroid 2 and in a plane substantially normal to the major axis of the toroid. If the conductive walls defining the toroid 2 are constructed to be substantially transparent to the field from the primary coil 7 (one such toroid construction will be described in connection with FIGURE 2), the primary coil will induce a current in the gas. This induced current gives rise to a magnetic field that provides the auxiliary magnetic gas confinement field referred to.

As will now be explained in connection with FIGURES 2 to 4, the novel method and apparatus of the invention may be used to control a thermonuclear of fusion reaction and has present research utility in that field.

As is known, if a hydrogen isotope, such for example as deuterium, is heated to a temperature of the order of tens or hundreds of millions of degrees Kelvin a thermonuclear reaction is produced wherein energy is released by means of what appears to be conversion of mass to energy. Some of the released energy appears to be in the form of kinetic energy of the reaction end products, that is, of neutrons and charged particles. Some of this kinetic energy is apparently transformed into what is commonly referred to as bremsstrahlung radiation, that is, exceedingly short wave length electromagnetic radiation such as hard X-ray radiation. A sustained output of bremsstrahlung radiation, requiring a sustained thermonuclear reaction, can be used to provide useful power in the form of electricity, the electricity being produced by an appropriate energy converter such as a steam generator utilizing means for absorbing the bremsstrahlung radiation and converting it into heat. Some of the kinetic energy of the charged particles can apparently be converted directly into electricity by the interaction of the charged particles with applied electromagnetic fields, the electrical energy being produced by the motion of the moving particles through the electromagnetic flux lines.

Figure 8:
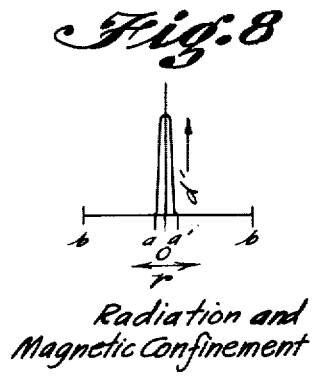
FIGURE 8 is a graphical representation of a confinement arrangement employing both radiation and magnetic energy for the control of gas under conditions of high compression and high temperature.

The thermonuclear reaction control means according to the invention will be described in connection with FIGURES 2 to 4. The gas to be subjected to the thermonuclear reaction, for example a hydrogen isotope such as deuterium or tritium, is first ionized as by being subjected to electromagnetic radiation. The ionized gas is then subjected to radiation pressure of a magnitude and character such that a stable, steady-state confinement of the gas body is realized, the gas body taking the form of a gas filament. A toroid 10, defining a resonant cavity therein, is used as a physical container within a central portion of which the thermonuclear reaction referred to is to be confined. The toroid 10 has a major radius A that is larger than its minor radius $b$ (FIGURE 2). The minor radius $b$, in turn, is preferably appreciably larger than the radius $a$ of the gas filament undergoing thermonuclear transformation. For example, the minor radius $b$ may be of the order of about 100 to about 1,000 times larger than the gas filament radius $a$. In the interest of simplicity of illustration and explanation this ratio is not shown to scale in FIGURE 3. This ratio is desirable in order to insure that, as explained above in connection with the desired modes of operation, the field strength of the confining radiation is appreciably larger at the surface of the gas filament than at the surface of the toroidal cavity. The resonant cavity within the toroid 10 is defined by conductive walls. The walls, for reasons to be explained in connection with FIGURE 8, are made up of a number of conductive rings or bands 12 encircling the meridian or small circumference $s$ of the toroid 10. Each of the conductive bands 12, which may for example be of a conductive material such as copper, are insulated from adjacent conductive bands by insulating material 14 so that the toroid 10 is effective to conduct electric current substantially only in directions along the small circumferences $s$ of the toroid, that is, along planes containing the large axis of the toroid.

A radio frequency oscillator 24 is connected to the toroid 10 to supply radio frequency energy to the toroidal cavity therewithin. This oscillator 24 is preferably of a high power type capable of being tuned over a frequency range such that radio frequency energy may be fed into the toroid at a wave length anywhere from (for $TM_{01}$ mode operation) as large as $4b$ to one as small as a small fraction of $b$. The oscillator may be one of the conventional high power oscillator circuits such, for example, as one which lends itself to the use of such high power output tubes as power triode Radio Corporation of America type 5831.

A supply 26 of the gas to be utilized within the toroid 10, deuterium in the form of the invention here exemplified, is connected for entry into the toroid. While the use of deuterium may be preferred due to its relatively low cost at this time, a mixture of tritium and deuterium may instead be used. In such case the required operating temperature of the thermonuclear reaction is reduced from the order of 100 million degrees Kelvin to the order of 10 million degrees Kelvin. However, the use of tritium, either alone or in combination with deuterium, is not presently preferred due to the high cost and radioactivity of tritium. While still other nuclear transformation reactions may be effected by the use of the method and apparatus of the invention, such as fusion reactions involving the use of other substances having large reaction cross-sections such as lithium, these other reactions are also not preferred at this time since deuterium is presently cheaper and easier to work with.

Figure 5:
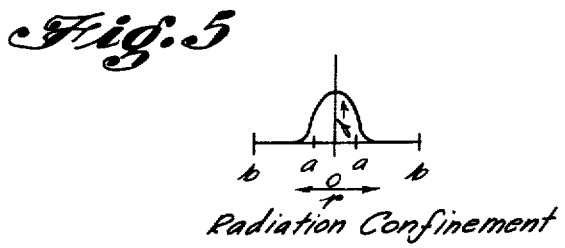
FIGURE 5 is a graph illustrating an aspect of radiation confinement according to the invention.

A fusion thermonuclear reaction may be created and confined within the toroid 10 by means of the following: A desired quantity of deuterium gas from the gas supply 26 is fed into the toroid 10. The quantity of gas used is determined by the output desired, the power output being a function of the quantity of gas in the toroid. The gas introduced into the container may be at ambient temperature and at a relatively low density, that is, at a temperature of the order of 300 degrees Kelvin and a density of the order of $10^{12}$ particles per cubic centimeter. Radio frequency energy from the oscillator 24 is then fed into the toroidal cavity. This energy ionizes and heats the gas until the gas is substantially completely ionized, that is, to a temperature of the order of 100,000 degrees Kelvin. As the gas is ionized and heated radiation pressure, from radio frequency energy reflected from ionized gas and the walls of the cavity, exerts a force on the gas urging it in directions away from the walls forming the cavity and toward the center of the cavity. The exertion of this force on the gas increases its temperature to of the order of a hundred million degrees Kelvin, corresponding to particle velocities of the order of tens of thousands of miles per second, and increases its density to the order of $10^{14}$ particles per cubic centimeter. The density of the gas in the toroid at this stage is illustrated in FIGURE 5 where density $d$ is plotted against radius $a$ as measured along the minor radius of the toroid 10 (FIGURE 2). It will be noted that the density of the gas is now highest at the center $o$ of the toroidal cavity and falls off until substantially no gas is present in regions adjacent to the walls defining the cavity. A thermonuclear reaction now takes place in the center regions of the toroid wherein the deuterium nuclei $_1H^2$ have enough kinetic energy to overcome their mutual electrostatic repulsion and are converted either directly or indirectly into at least helium nuclei ($_2He^4$), neutrons (n), and the hard radiation referred to as bremsstrahlung radiation.

If it is considered that the main thermonuclear reaction involves the transformation of deuterium ($_1H^2$) into either light helium ($_2He^3$) and neutrons (n), or tritium ($_1H^3$) and ordinary hydrogen ($_1H^1$), the two reactions occurring with about equal probability:

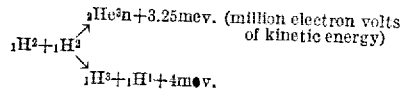

Some of the tritium ($_1H^3$) thus formed will react with deuterium ($_1H^2$):

$$_1H^3 + _1H^2 \rightarrow _2He^3 + n + 17.6 \text{ mev.}$$

and some of the light helium ($_2He^3$) will react with deuterium ($_1H^2$):

$$_2He^3 + _1H^2 \rightarrow _2He^4 + _1H^1 + 18.3 \text{ mev.}$$

Thus, as an end product there is produced ordinary hydrogen ($_1H^1$), ordinary helium ($_2He^4$), neutrons (n), and kinetic energy. It is this kinetic energy that produces the bremsstrahlung energy referred to. While ordinary hydrogen ($_1H^1$) may take part in the fusion process, the amount of energy produced by such fusion would be relatively small in comparison to the other fusion processes described above. For example, while a $_1H^2$ plus $_1H^2$ reaction may take .00003 second at the fusion reaction temperatures referred to, a $_1H^1$ plus $_1H^2$ reaction takes of the order of one-half second (to produce $_2H^3$ plus hard radiation plus 5 mev.).

Figure 4:
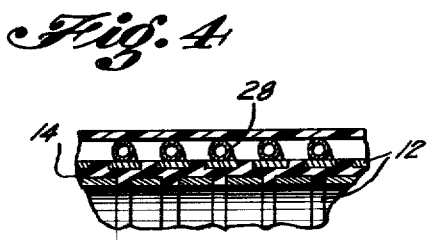
FIGURE 4 is a fragmentary sectional view taken through line 4—4 of FIGURE 3.

As indicated in FIGURES 2, 3, and 4, means are provided for extracting energy from the fusion reaction described. Water is fed from an inlet pipe 27 (FIGURE 2) into coils 28 (FIGURE 4) within the walls of the toroid 10 for absorbing the heat produced by bremsstrahlung radiation from the fusion reaction. The coils 28 represent only schematically the energy absorption means to be used for extracting energy from the fusion reaction. In practice, the coils 28 may instead be other energy absorption material. This bremsstrahlung radiation heats the water converting it into steam. The steam is then fed out of the toroid 10 through an outlet pipe 29 and into a steam utilization device 31. The steam utilization device 31 may be any of the known devices of this type, such as a steam turbine, and will therefore not be further described. The steam utilization device 31 is coupled to an electrical generator 33 for driving it to produce an electric output. A portion of the electric output may be used to provide the energy required for operating the radio frequency oscillator 24. To this end the electrical generator 33 may be connected to a capacitor 35 for storing a required amount of electrical energy, the stored energy being fed into the radio frequency oscillator as required. Since electrical energy storage by means of capacitors is well known in the art such storage will not be described in further detail.

If the compressed charge particles are periodically allowed to expand within and against the electromagnetic field provided by the radio frequency oscillator 24, there is produced within the toroid an increased radio frequency field. At least part of the electrical energy from this field can be extracted from the toroid 10 by means of a wave guide output such as the wave guide 25 used for feeding energy from the radio frequency oscillator into the toroid. Thus, some of the end product of the thermonuclear reaction may be extracted directly as electrical energy. Some of this electrical energy may be fed into a desired electrical utilization device through outlet 37 connected to the wave guide 25, and some of the energy may be fed back to the radio frequency oscillator 24 to serve as at least part of the energizing source for it. Alternatively, as in the case of the electrical energy output from the generator 33, some of the electrical energy fed into the wave guide 25 from the toroid 10 may be stored in the capacitor 35 for later use by the radio frequency oscillator.

As has been indicated before, the wave length of the radio frequency energy supplied by the radio frequency oscillator 24 to the toroid 10 is of the order of four times the length of the minor radius $b$ (FIGURE 3) of the toroid 10 when the toroid is excited in the $TM_{01}$ mode. The foregoing is the case substantially only when the gas within the toroid has not been heated and compressed to a sufficient temperature to cause it to act as a well defined filament or inner conductor of a coaxial resonant cavity. After the gas becomes a conductive filament and thus a reflective gas body, the effective minor radius of the toroid becomes, instead, the distance between the outside surface of the gas body and the cavity walls. Then, as indicated before in connection with FIGURE 7, it is desirable to have the peak field strength B of the magnetic field at $a$, the surface of the gas body. Thus, instead of the required wave length being four times the length of the minor radius $b$, the actual wave length should be four times the distance between the gas body and the cavity walls. Furthermore, since the gas body radius $a$ decreases with increasing electromagnetic radiation pressure and consequent increase in temperature, the wave length of the radio frequency energy should correspondingly increase during gas compression so that the four times ratio referred to is preserved. Consequently, the radio frequency oscillator 24 is preferably of a variable frequency variety so that the frequency changes referred to may be made. (In the case of the $TE_{01}$ mode no peak magnetic fields are involved; therefore, no corresponding decrease in frequency is required of the radio frequency oscillator 24.) An appropriate detector 39, which may be a detector of the kind referred to in connection with the detector 6 of FIGURE 1, is used to sense the temperature of the gas body within the toroid 10 and, since the radius of the gas body is a function of temperature, detect the radius of the gas body. This information is fed to an appropriate detector output device 41 which serves as means for controlling the frequency of the radio frequency oscillator. While the wave length of the radio frequency energy, in the TM mode excitation, is preferably made a function of the distance between the cavity walls and the gas body, in the event the frequency is not decreased with decreasing radius $a$ as indicated above the transfer of energy from the radio frequency oscillator 24 to confinement energy within the toroid will still be effected though not as efficiently as when the frequency is adjusted. Consequently, the use of a variable frequency radio frequency oscillator is preferred. As in the case of the detector 39 for the frequency control means of the radio frequency oscillator 24, another detector 45 may be connected to the toroid 10 for determining when an additional supply of deuterium is required. To this end the deuterium supply detector 45 is connected to the control valve 23 of the deuterium supply 26 so as to feed a required charge of deuterium into the toroid 10 when required.

As indicated before, an auxiliary magnetic field may be used in combination with the radiation pressure arrangement described to provide a resultant confinement force that requires an appreciably lower confinement input energy. Referring to FIGURE 2, the supplemental magnetic pinch field is provided by low frequency electric energy, for example 60 cycle alternating current, which is fed from an appropriate energy source into the resonant cavity in the toroid 10 by means of a transformer 16. The transformer 16 is coupled to the toroid 10 for inducing a secondary current in the ionized gas to be contained within the toroid. The transformer 16 has a transformer core 20 linked to the toroid 10 (the core being any conventional transformer core material such as laminated sheets of silicon steel) and a primary winding 22 wound around the core 20. Therefore, the electric fields induced by the primary winding 22 lie in planes normal to the major axis of the toroid. Since, as has been indicated above, the conductive bands 12 that define the resonant cavity of the toroid do not extend any appreciable distance along the major circumference of the toroid, the body of the toroid is substantially transparent to energy induced by the primary winding; only conductve gas 18 within the toroid will be able to receive induced energy from the transformer. Also, in the case where the transformer 16 is used to provide the supplemental magnetic gas confinement field, the energy extraction coils 28 (FIGURES 3 and 4) or their equivalent, described above, are made either of an electrically non-conductive material or of short sections of conductive material in order to insure against a shunting of the transformer fields by the coils.

If the gas 18 has been previously subjected to sufficient radiation from the radio frequency oscillator 24 to become substantially completely ionized, say at a temperature of the order of about one hundred thousand degrees Kelvin, the ionized gas becomes sufficiently conductive to act as a filament of plasma forming a toroidal transformer secondary winding running substantially along the center line of the toroidal cavity. The energy from the transformer is thus fed directly to the filamentary plasma giving rise to the substantially magnetostatic pinch effect referred to. The magnetostatic pinch may be made of sufficient magnitude to provide the greater portion of the power input required to establish the desired confinement of the gas. The radiation pressure supplied by the oscillator 24 is made only of as large a magnitude as required to force back toward the center of the toroidal cavity any gas which would otherwise tend to escape from the center by virtue of the known kinks or instabilities (described on page 347 of the article referred to) inherent in magnetic pinch confinement. Thus, the magnetic pinch confinement provides the greater portion of the required confinement energy, and the radiation pressure fields render stable the magnetic confinement by forcing back to the center of the toroid any gas which might tend to momentarily escape the magnetic confinement force and flow toward the walls of the toroid.

When the combined radiation pressure and magnetostatic gas confinement arrangement is used the gas is packed closer to the center of the toroid (as indicated in FIGURE 8) than when radiation confinement alone is used (the latter being represented in FIGURE 5). In the case of the combined fields confinement the density of the gas at the center of the toroid is of the order of $10^{17}$ particles per cubic centimeter at temperatures of the order of $10^8$ degrees Kelvin. A thermonuclear reactor according to the combined arrangement may, for example, have a power output on the order of $10^{14}$ watts if radius $b=10$ meters, radius $a=.3$ centimeter, and the thermonuclear gas temperature is about $1.2 \times 10^9$ degrees Kelvin.

As indicated above with respect to the reaction temperature detectors 39 and 45, a further detector 21 may be connected to the toroid 10 for determining the required amplitude of current required to provide the desired supplemental magnetic field. The output from the detector 21 is connected to current control apparatus 49 for controlling the magnitude of current through the transformer primary 22 as a function of the temperature of the gas within the toroid 10. Similarly, the detector 21 may also be connected to the radio frequency oscillator 24 for controlling the magnitude of radiation pressure energy supplied to the toroid 10.

Figure 6:
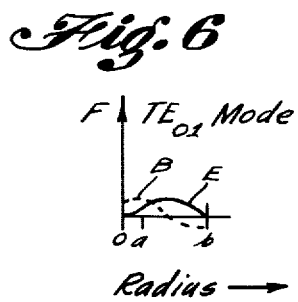
FIGURE 6 is a graphical illustration of the intensities of the electric and magnetic fields in one mode of operation of gas confinement apparatus of the type illustrated in FIGURES 1 and 2.

While a gas confinement arrangement has been described with respect to a method and apparatus for providing an opportunity to observe high temperature gases, it is realized that the confinement achieved in the manner herein described may be used for other end purposes. For example, as illustrated in FIGURE 6 the linear confinement arrangement referred to may be used to provide a source of high velocity charged ions. An elongated container 30, having a closed end portion 32 and an apertured opposite end portion 34, defines a resonant cavity or chamber therein. A controlled amount of gas from a gas source 46 is heated to a desired temperature and then allowed to escape through the aperture 36 in the apertured end portion 34 to provide a high velocity stream of charged ions.

As in the case of the toroidal gas confinement arrangement described with respect to FIGURE 1, the container 30 is made of a conductive material. While magnetic fields, provided by electromagnets 38 and 40, are used to prevent heated gas within the container from reaching the ends of the container, these fields react magnetically with the gas within the cavity and penetrate conductive material such as copper. Thus, the single cylindrical conductor does not impede the action of these magnetic fields. One of the electromagnets 40 is adapted to be connected to a variable voltage source, as indicated by the variable connection to the battery 42, while the other of the electromagnets 38 is connected to a single voltage source. The variable voltage source afforded one of the electromagnets 40 allows the magnetic field of that electromagnet to be diminished to an extent sufficient to allow ions 43 to escape from the container 30 and through the aperture 36 in one of the end walls 34 of the container.

As in the case of the toroidal arrangement of FIGURE 1, a radio frequency oscillator 44 is coupled to the cavity defined by the elongated container 30 to provide the required electromagnetic radiation pressure field. This radiation pressure field preserves the side walls of the container from the gas and heats the gas to a desired temperature, while the magnetic fields from the electromagnets 38 and 40 control the spacing of the gas from the end walls 32 and 34 of the container.

As has been indicated above, a certain amount of energy will be lost from the radio frequency electromagnetic radiation pressure field in the cavity to the walls defining the cavity, the loss being the consequence of waves penetrating the walls. This radio frequency energy loss must be made up by increased energy input from the radio frequency energy source. Since the losses in the walls of the conductor are resistance losses, they can be substantially eliminated if the walls are made superconductive, that is, if the walls are cooled by well-known liquid hydrogen or liquid helium cooling apparatus (not shown) to a temperature close enough to absolute zero so that the well-known phenomenon of superconductivity is effected. Since the temperature required for superconductivity is lower in the presence of high intensity magnetic fields than in the absence of such fields, the temperature of the cavity walls must be maintained closer to 0° K. than in the more usual superconductive arrangements where no magnetic fields are present.

That the electromagnetic radiation field referred to can effect the required confining action can be seen from the following analysis. The analysis will be made in connection with the $TM_{01}$ mode excitation referred to.

Consider a cylindrical cavity of radius $b$, of infinite length, and defined by a perfectly conducting wall. Let the axis of the cavity coincide with the axis of a cylindrical coordinate system $r$ (radial distance), $\zeta$ (azimuth distance) and $z$ (axial distance). A complete description of the plasma and the confining field is afforded if the following quantities are known as functions of space and time:

The number density of electrons_____ $n$
The number density of ions_____ $N$
The electric field_____ $\vec{E}$
The magnetic field_____ $\vec{B}$ The electromagnetic field is subject to Maxwell's equations $$\text{div } \vec{E} = \rho \qquad (1)$$

$$\text{curl } \vec{B} = \frac{\delta \vec{E}}{\delta t} = j \qquad (2)$$

$$\text{div } \vec{B} = 0 \qquad (3)$$

$$\text{curl } \vec{E} + \frac{\delta \vec{B}}{\delta t} = 0 \qquad (4)$$

where $\rho$ represents the charge density, $t$ represents time, and $j$ represents the combined current of electrons and ions. The charge density and the current density are related to the number densities by the following equations:

$$\rho = (N-n)e \qquad (5)$$

$$\vec{j} = (N\vec{V} - n\vec{v})e \qquad (6)$$

where $e$ is the elementary charge, either of an electron or ion, and where $\vec{V}$ and $\vec{v}$ are the velocities of the ions and electrons, respectively.

The gas or plasma to be confined will thus be treated as a mixture of two gases which are oppositely charged. The forces acting on these gases are:

$$\vec{F} = Ne[\vec{E} + \vec{V} \times \vec{B}] \text{ and } \vec{f} = -ne[\vec{E} + \vec{v} \times \vec{B}] \qquad (7)$$

$\vec{F}$ and $\vec{f}$ representing, respectively, the forces acting on the ions and the forces acting on the electrons. It will be assumed that both gases are at the same temperature so that their partial pressures are $$P = NkT \text{ and } p = nkT \qquad (8)$$

respectively, $k$ being Boltzmann's constant, T representing temperature, and P and $p$ representing, respectively, the partial pressure of ions and electrons. The motion of the gases is governed by Newton's law for change of momentum:

$$\vec{F} - \text{grad } NkT = NM\frac{D\vec{V}}{Dt} \text{ and } \vec{f} - \text{grad } nkT = nm\frac{D\vec{v}}{Dt}$$
$$(9)$$

where M and $m$ represent, respectively, the masses of an ion and electron, and $t$ represents time. Finally the continuity equations for both ions and electrons must be satisfied:

$$\frac{\delta N}{\delta t}+\text{div }(N\vec{V})=0 \text{ and } \frac{\delta n}{\delta t}+\text{div }(n\vec{v})=0 \quad (10)$$

This description of the plasma is essentially macroscopic. The effect of collisions between like particles is summed up in their partial pressures. Collisions between unlike particles are neglected. The coulomb interaction is represented by Equation 5, which gives rise to an electric field, Equation 1, which in turn exerts forces on the particles, the first terms of Equation 7. While the system of Equations 1 to 10 is relatively complex, it admits of a relatively simple solution.

To find this solution it is required that all quantities be independent of $p$ and $z$ and that only $\vec{E}$, $\vec{B}$, $\vec{V}$, and $\vec{v}$ depend on $\vec{t}$. $\vec{E}$ is written in the form:

$$\vec{E}=\{E_r(r), 0, E(r)\cos(\omega t)\} \quad (11)$$

In this notation, the three terms in the bracket represent the $r$, $\zeta$, and $z$ components, respectively. Finally it is required that the velocities have only $z$ components:

$$\vec{V}=\{0, 0, V(rt)\}$$
$$\vec{v}=\{0, 0, v(rt)\} \quad (12)$$

It will now be shown how the system of equations breaks up into manageable portions. The continuity Equations 10 are already satisfied. From Equation 11 one finds $\vec{B}$ using Equation 4:

$$\vec{B}=\left\{0, \frac{1}{\omega}E'(r)\sin\omega t, 0\right\} \quad (13)$$

where $E'$ represents the derivative of $E$ with respect to $r$. Differentiating Equation 2 with respect to $t$, and substituting Equations 11 and 13 into Equation 2, one obtains $$\frac{\delta j_z}{\delta t}=\left\{\omega^2 E+\frac{1}{r}\frac{d}{dr}(rE')\right\}\cos\omega t \quad (14)$$

This Equation 14 expresses the currents as the sources of the fields. Now we shall express them as caused by the fields.

Consider the momentum Equations 9. Neither the magnetic force nor the pressure gradient have components in the $z$ direction. Hence the $z$ components of Equation 9 become $$eNE\cos\omega t=NM\left(\frac{\delta V}{\delta t}+V\frac{\delta}{\delta z}V\right)$$

and $$-enE\cos\omega t=nm\left(\frac{\delta v}{\delta t}+v\frac{\delta}{\delta z}v\right) \quad (15)$$

The ion and electron velocities depend only on $r$ and $t$, so one finds $$\frac{\delta V}{\delta t}=\frac{eE}{M}\cos\omega t \text{ and } \frac{\delta v}{\delta t}=-\frac{eE}{m}\cos\omega t \quad (16)$$

Differentiating Equation 6 with respect to $t$, and using Equation 16, one obtains $$\frac{\delta j_z}{\delta t}=\left(\frac{e^2 N}{M}+\frac{e^2 n}{m}\right)E\cos\omega t \quad (17)$$

The elimination of $$\frac{\delta j_z}{\delta t}$$

from Equations 14 and 17 yields an ordinary differential equation for $E(r)$:

$$\frac{1}{r}\frac{d}{dr}\left(r\frac{dE}{dr}\right)+\left(\omega^2-\frac{e^2 N}{M}-\frac{e^2 n}{m}\right)E=0 \quad (18)$$

This Equation 18 determines $E(r)$ if $N$ and $n$ are known.

Equations for these ion and electron densities can be found from the radial components of Equation 9. With the aid of Equation 12, Equations 9 reduce to $$F_r-kT\frac{dN}{dr}=0 \text{ and } f_r-kT\frac{dn}{dr}=0 \quad (19)$$

The electric part of the Lorentz force in the radial direction is due to $E_r$, which is related to the particle densities by Equations 1 and 5:

$$\frac{1}{r}\frac{d}{dr}(rE_r)=(N-n)e \quad (20)$$

Integration of Equation 16 yields ion and electron velocities $V$ and $v$:

$$V=\frac{eE}{M\omega}\cos\omega t \text{ and } v=-\frac{eE}{m\omega}\cos\omega t \quad (21)$$

Now the cross products with $\vec{B}$ can be formed to obtain the magnetic part of the Lorentz force Equation 7. For the ions, one obtains $$eN\vec{V}\times\vec{B}=\frac{e^2 N}{M\omega^2}\left\{E\frac{dE}{dr}\sin^2\omega t, 0, 0\right\} \quad (22)$$

An analogous expression is obtained for the electrons. The magnetic force thus has only a radial component. The magnetic force is proportional to $E^2$, and thus is independent of the sign of the charge! Thus ions and electrons experience a force in the same direction! Also, while the magnetic force oscillates with a frequency $2\omega$, it does not change sign with time since $\sin^2\omega t$ is always positive. This magnetic force can also be written as $$F_{m,r}=-\frac{e^2 N}{4M\omega^2}\frac{d}{dr}(E^2(r))(1-\cos 2\omega t) \quad (23)$$

from which it can be seen that the magnetic force always points in the direction of decreasing $E^2$, that is to the nulls or nodes of $E$. Thus, as has been indicated before in connection with the discussion of the $TE_{01}$ mode, a charged particle is always attracted to a node of an electric field. Since an electrical null or node will appear in the region of greatest ionized gas or plasma density, and the electrical field will increase in the direction of decreasing plasma density (because the latter has a low impedance), charged particles that become separated from the main body of the plasma will be driven back into it.

The oscillating character of the magnetic force has a large effect only where the plasma frequency equals nearly $2\omega$; this happens only in a small and unimportant region. Consequently, the oscillating part of this force may be disregarded. Thus, Equations 21, which are the radial parts of Equation 9, now become $$eNE_r-\frac{e^2 N}{4M\omega^2}\frac{d}{dr}E^2-kT\frac{d}{dr}N=0 \quad (24)$$

and $$-enE_r-\frac{e^2 n}{4m\omega^2}\frac{d}{dr}E^2-kT\frac{d}{dr}n=0 \quad (25)$$

The problem is thus reduced to one of finding the solutions for the four ordinary differential Equations 18, 20, 24, and 25, and for the four unknowns $E(r)$, $E_r(r)$, $N(r)$, $n(r)$. To single out the particular solution of interest additional conditions must be given. Some of these take the form of boundary conditions:

$$\frac{dE}{dr}(r=0)=0 \quad (26)$$

$$E(0)=E_0 \quad (27)$$

and $$E(b)=0 \quad (28)$$

The first of these conditions excludes solutions which are singular at $r=0$, the second condition specifies the intensity of the radiation field, and the third condition is required by the presence of the perfectly conducting cavity wall. If N and $n$ are considered given, then Equation 18, together with the boundary condition Equations 26, 27, and 28, would characterize a Sturm-Liouville eigen-value problem, $\omega$ being the eigen-value. For the electrostatic field one has, by symmetry, $$E_r(0)=0 \qquad (29)$$

In addition one should give the values of $N(0)$ and $n(0)$ to completely determine the solutions. It appears, however, that this is not possible. Therefore, one has to instead prescribe the total number of charges of each kind:

$$2\pi \int_0^b Nr\,dr \text{ and } 2\pi \int_0^b nr\,dr \qquad (30)$$

It will be assumed that the total charge in the plasma is zero, so that $$\int_0^b (N-n)r\,dr=0 \qquad (31)$$

Thus one finds that $$E_r(b)=0 \qquad (32)$$

On differentiation, there is realized $$\frac{dN}{dr}=\frac{dn}{dr}=0,\, r=0,\, r=b \qquad (33)$$

Equations 24 and 25 admit of an important first integral. If Equations 24 and 25 are first divided by their respective ion and electron densities $N$ and $n$, and then added, one obtains an integrable equation because $E_r(r)$ drops out; the integrable equation yields the product of the densities as a function of $E(r)$:

$$Nn=\text{const. exp.}\left\{\frac{e^2E^2}{4\omega^2kT}\left(\frac{1}{m}+\frac{1}{M}\right)\right\} \qquad (34)$$

The radiation field and the gas or plasma density will now be obtained for the limit of infinite coulomb interaction in Equations 24 and 25

$$\left(e\to\infty\,;\frac{e^2}{m} \text{ and } \frac{e^2}{M} \text{ being fixed}\right)$$

In this case no charge separation can occur and the problem is greatly simplified. The results thus obtained are representative of the radiation confinement since the coulomb interaction is very strong.

Starting from Equation 34, which does not contain the (infinite) coulomb interaction, it is required that $$N=n \qquad (35)$$

Therefore, $$N=n=n_0 \exp\left[\frac{-e^2E^2}{8\omega^2kT}\left(\frac{1}{m}+\frac{1}{M}\right)\right] \qquad (36)$$

This Expression 36 is substituted in Equation 18 so that it becomes an ordinary second order differential equation for $E(r)$:

$$\frac{1}{r}\frac{d}{dr}\left(r\frac{dE}{dr}\right)+\left[\omega^2-e^2\left(\frac{1}{m}+\frac{1}{M}\right)n_0e^{\frac{-e^2E^2}{8\omega^2kT}\left(\frac{1}{m}+\frac{1}{M}\right)}\right]E=0 \qquad (37)$$

$E_r(r)$ vanishes. Equation 37 can be brought into a more convenient dimensionless form. Using the following transformations:

$$x=\omega r$$

$$u^2(x)=\frac{e^2E^2(r)}{8\omega^2kT}\left(\frac{1}{m}+\frac{1}{M}\right)$$

and $$\alpha=\frac{n_0e^2}{\omega^2}\left(\frac{1}{M}+\frac{1}{m}\right) \qquad (38)$$

one obtains $$u''+\frac{1}{x}u'+(1-\alpha e^{-u^2})u=0 \qquad (39)$$

with the boundary conditions $$u(0)=u_0,\, u'(0)=0, \text{ and } u(b\omega)=0 \qquad (40)$$

The fields and densities in terms of the function $u(x)$ are $$\left.\begin{array}{c}E(r)\\ \\B(r)\end{array}\right\}=\sqrt{8n_0kT}\left\{\begin{array}{c}\dfrac{u}{\sqrt{\alpha}}\\ \\\dfrac{u'}{\sqrt{\alpha}}\end{array}\right. \qquad (41)$$

$$n=N=n_0e^{-u^2}$$

The solution $u(x)$ depends on two parameters $\alpha$ and $u_0$. The parameter $\alpha$ is a measure of the transparency of the plasma to the radiation, since the depth of penetration of an electromagnetic field is given by $d=1/\omega\sqrt{\alpha-1}$. The cases of practical interest are obtained by choosing $\alpha$ and $u_0$ each appreciably less than 1. When $\alpha$ is appreciably less than 1 the plasma is dense enough to be a good reflector; when $u_0$ is appreciably less than 1 only a small amount of the radiation penetrates to the core of the plasma, and therefore determines the radius of the plasma column.

With these parameter values it is not difficult to perceive the general shape of the solution $u(x)$: For small values of $x$, $u$ itself is small and $e^{-u^2}$ is equal to about unity, so that the differential equation has the solution $$u=u_0J_0(i\sqrt{\alpha-1}\,x) \qquad (42)$$

This is a rapidly growing function, which therefore soon leaves the domain of its validity. As $u$ becomes larger than about $\sqrt{lg\alpha+4}$ the differential equation simplifies to the ordinary Bessel equation with the solution $$u=AJ_0(x)+BN_0(x) \qquad (43)$$

The actual solution smoothly bridges these two approximating ones.

The plasma density, being proportional to $e^{-u^2}$, remains fairly constant near $x=0$ and then drops off very rapidly as illustrated in FIGURE 4. The slopes of $u(x)$ and of $e^{-u^2(x)}$ have a maximum at $x$, which defines a radius $$a=\frac{x_1}{\omega}$$

It will be called the plasma radius because most of the plasma lies inside the cylinder with radius $a$. Thus the plasma is really confined.

If the solution $u(x)$ is continued beyond $x_2$ where its first maximum occurs, the plasma density, $e^{-u^2}$ increases again. In a practical arrangement, however, one wants the density to be large only at the center $x=0$. Beyond $x_2$ the particle density should stay small.

To achieve this, assume that the plasma has been removed at points $x>x_2$. Mathematically this means setting $\alpha=0$ in Equation 39 for $x>x_2$. The discontinuity thus introduced in the higher derivatives of $u$ is extremely small since, at $x_2$ the term $\alpha e^{-u^2}=\alpha e^{-u^2}$ max is practically zero. Thus the solution $u$ continues after $x_2$ as an ordinary cylinder function according to Equation 43. The first zero of $u$, namely $x_3=\omega b$ marks the radius of the cavity wall.

Physically, this removal of plasma upsets the equilibrium at $x_2$ where the particle density drops from $e^{-u^2}$ to zero. Consequently, particles will escape at a rate given by their density at $x_2$, and by their thermal velocity:

$$2\pi r_2 n(r_2)\sqrt{\frac{kT}{m}}$$

The total number of particles confined is approximately $\pi a^2 n(0)$. Thus the half life of the confinement is about $$t = \sqrt{\frac{m}{kT}} \frac{a^2}{2r_2} e^{u^2(x_2)} \qquad (44)$$

At $T=10^8$ degrees Kelvin this time ranges from $10^{300}$ to $10^{400}$ seconds. Hence, practically no leakage of plasma occurs.

Finally, let us examine $u'(x)$ which represents the magnetic field B according to Equation 41. At $x_1$ (radius $a$ in FIGURE 1) $u'$ has a sharp maximum. Outside this point it behaves very nearly like the magnetic field in a coaxial line, while inside it drops rapidly to zero (at radius 0 in FIGURE 7) in a manner familiar from the skin effect in wires. It is important to note that the magnetic B field, and hence the magnetic pressure, is much larger at the plasma ($r=a$) than at the cavity wall ($r=b$). This effect is due to the cylindrical geometry and apparently occurs only for the TM mode with no $\phi$ variation. Equation 39 has been integrated numerically for various values of $\alpha$ and $u_0$. As explained above, $\alpha$ is set equal to zero for $x > x_2$, where $x_2$ is the first maximum of $u$.

In the chart below the values of $\alpha$, $u_0$, $x_1$, $u'(x_1)$, $x_2$, $u(x_2)$, $x_3$, and $u'(x_3)$ are given for a number of different choices of the following parameters:

The plasma radius $a = \dfrac{x_1}{\omega}$

The cavity radius $b = \dfrac{x_3}{\omega}$

The magnetic field:

At the plasma $B(a) = \sqrt{8n_0 kT} \dfrac{u'(x_1)}{\sqrt{\alpha}}$

At the wall $B(b) = \sqrt{8n_0 kT} \dfrac{u'(x_3)}{\sqrt{\alpha}}$

The maximum electric field $E_{\max} = \sqrt{8n_0 kT} \dfrac{u(x_2)}{\sqrt{\alpha}}$ The ratio of the minimum to maximum plasma density $$\frac{n_{\min}}{n_{\max}} = e^{-u^2(x_2)}$$

Each pair of $\alpha$ and $u_0$ values gives rise to a whole family of physical relationships since one is still free to choose a temperature T and a maximum density $n_0$.

[Characteristic values of solutions of $u'' + \frac{1}{x}u' + (1e^{-u})u = 0$]

| $\alpha$ | $u_0$ | $x_1$ | $u'(x_1)$ | $x_2$ | $u(x_2)$ | $x_3$ | $u'(x_3)$ |
|---|---|---|---|---|---|---|---|
| $10^4$ | .707 | .027 | 43.7 | .764 | 6.14 | 2.70 | −3.89 |
| $10^4$ | .1 | .048 | 72.1 | .888 | 11.0 | 2.82 | −7.17 |
| $10^4$ | $10^{-2}$ | .074 | 80.9 | .954 | 15.3 | 2.88 | 10.2 |
| $10^4$ | $10^{-3}$ | .100 | 85.8 | 1.026 | 18.8 | 2.95 | 12.6 |
| $10^4$ | $10^{-4}$ | .128 | 86.8 | 1.098 | 21.8 | 2.97 | −14.9 |
| $10^4$ | $10^{-5}$ | .148 | 89.5 | 1.15 | 24.5 | 3.02 | −16.7 |
| $10^5$ | .707 | .0027 | 437 | .616 | 7.68 | 2.58 | −5.46 |
| $10^5$ | .1 | .0048 | 721 | | | | |
| $10^5$ | $10^{-3}$ | .0100 | 852 | .8134 | 30.0 | 2.76 | −19.4 |
| $10^6$ | $10^{-4}$ | .0124 | 878 | .8158 | 38.5 | 2.76 | −24.8 |
| $10^6$ | $10^{-5}$ | .0148 | 895 | .818 | 46.1 | 2.76 | −29.7 |
| $10^5$ | $10^{-5}$ | .00148 | 8,950 | | | | |

As for example, let us choose:

Ratio of plasma frequency$^2$/applied electromagnetic frequency$^2$ ——— $\alpha = 10^6$, $u_0 = 10^{-3}$.
Temperature ——— $T = 3 \times 10^8$ degrees Kelvin.
Electron density ——— $n = 10^{19}$ electrons per cubic meter.

Thus:
Applied electromagetic frequency ——— $2.84 \times 10^9$ cyles per second.
Plasma radius ——— $a = .00168$ meter.
Cavity radius ——— $b = 4.64$ meters.
Toroid radius ——— $A = 46.4$ meters.
Mode ——— $TM_{01}$.
Magnetic field strength at the surface of the plasma ——— $B(a) = .548$ volt seconds per square meter.
Magnetic field strength at the wall ——— $B(b) = -1.25 \times 10^{-2}$ volt seconds per square meter.
Maximum electric field strength ——— $E_{\max} = 5.8 \times 10^6$ volts per meter $n_{\min}/n_{\max} = 10^{-390}$.
Gas confinement time ——— $t = 10^{378}$ seconds.

From the foregoing it is seen that electromagnetic radiation pressure may be used to confine an ionized gas to a relatively small volume even though the gas may be at extremely high temperatures.

While the arrangement of the invention has been described with respect to apparatus useful in the study of high temperature gases and in the provision of a source of high velocity charged ions, it will be appreciated that the arrangement may be used in other fields where high gas temperatures or velocities are useful.

What is claimed is:

1. Gas confining apparatus including the combination of a container having electrically conductive walls defining a toroidal chamber, said walls being reflective with respect to electromagnetic radiation of microwave frequency, a gas source connected to said container to introduce gas therein, and a source of microwave electromagnetic energy coupled to the container, said source of electromagnetic radiation having a selected frequency which establishes standing waves within the toroidal chamber in a configuration in which electric field nodes are centrally disposed within the toroidal chamber for the confinement of gas therein spaced apart from the chamber walls, and a primary transformer winding positioned adjacent the toroidal chamber for producing magnetic fields which cooperate with the electromagnetic radiation within the toroidal chamber to confine the gas to an axial region of the toroidal chamber corresponding to the location of said electric field nodes.

2. Gas confining apparatus including the combination of a resonant toroidal chamber, a gas supply source coupled to the chamber, and a source of microwave energy coupled to the toroidal chamber having a frequency characteristic selected to produce a configuration of electric and electromagnetic fields within the toroidal chamber having an electric field node centrally disposed along an axis within the toroidal chamber so as to confine gas particles within the chamber in a ring out of contact with the chamber, and a primary transformer winding positioned adjacent the toroidal chamber for producing a magnetic field within the chamber to cooperate with the electromagnetic field for the confinement of gas therein spaced apart from the chamber walls.

3. A plasma confining apparatus comprising a resonant toroidal chamber, an oscillator coupled to said chamber for establishing radio frequency fields having centrally disposed electric field nodes to confine the plasma to an axial region of the chamber, control means coupled between said chamber and said oscillator means responsive to temperature variations of plasma confined within the chamber and adapted to correspondingly vary the frequency of the oscillator in such a manner that electric field nodes within the chamber are maintained in a position in the central region of said chamber, and means producing a magnetic field within the chamber to cooperate with the radio frequency fields in confining the plasma therein.

(References on following page)

References Cited in the file of this patent

UNITED STATES PATENTS

| | | |
|---|---|---|
| 2,575,334 | Dodd | Nov. 20, 1951 |
| 2,826,708 | Foster | Mar. 11, 1958 |
| 2,868,991 | Josephson et al. | Jan. 13, 1959 |
| 2,880,357 | Snow et al. | Mar. 31, 1959 |

OTHER REFERENCES

Nucleonics, February 1956, pp. 42–44.

Journal of Applied Physics, May 1957, vol. 28 No. 5, pp. 519–521.

Journal of Nuclear Energy II, vol. 5 pp. 71–73, 84, 85, Pergamon Press, London.

TID–7536 (Pt. 1), Controlled Thermonuclear Reactions, September 1957, publ. by A.E.C. Technical Information Service, Oak Ridge, Tenn., pp. 5–9, 26.

Physical Review, vol. 107, No. 2, July 15, 1957, pp. 345–350.

Nucleonics, August 1957, pp. 50–55.

Proceedings of the Second United Nations International Conference on the Peaceful Uses of Atomic Energy, vol. 32, held in Geneva Sept. 13, 1958, United Nations, Geneva, 1958, pages 161–163.

Vol. 31 of the above, pages 292–297, 6, 20, 32, 38.

Knox: Australian J. of Physics, vol. 10, No. 1, March 1957, pp. 221–225.

Controlled Thermonuclear Reactions by Samuel Glasstone, D. Van Nostrand Co., N.Y., 1960, pages 437–445.

Journal of Electronics and Control, volume 5, July–December 1958, pages 435–438 (by Weibel).

UNITED STATES PATENT OFFICE
CERTIFICATE OF CORRECTION

Patent No. 3,105,803                                          October 1, 1963

Erich S. Weibel

It is hereby certified that error appears in the above numbered patent requiring correction and that the said Letters Patent should read as corrected below.

Figure 7:
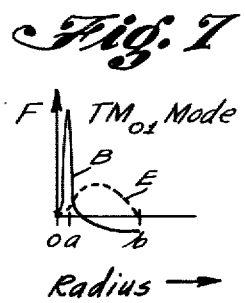
FIGURE 7 is a graphical illustration of the intensities of the electric and magnetic fields in another mode of operation of gas confinement apparatus of the type illustrated in FIGURES 1 and 2.

Column 6, lines 43 to 46, the upper portion of the formula should appear as shown below instead of as in the patent:

$$\nearrow \quad 2He^3 + n + 3.25 \text{ mev. (million electron volts of kinetic energy)}$$

column 11, line 20, strike out the arrow, first occurrence; column 15, line 12, for "FIGURE 1" read -- FIGURE 7 --.

Signed and sealed this 12th day of May 1964.

(SEAL)
Attest:

ERNEST W. SWIDER
Attesting Officer

EDWARD J. BRENNER
Commissioner of Patents